(12) United States Patent
Au

(10) Patent No.: US 9,807,947 B2
(45) Date of Patent: Nov. 7, 2017

(54) PLANT CULTIVATING CONTAINER

(71) Applicant: Auasia Agrotech Sdn. Bhd., Lahat, Ipoh, Perak (MY)

(72) Inventor: Chen Hsiung Au, Perak (MY)

(73) Assignee: AUASIA AGROTECH SDN. BHD. (MY)

( * ) Notice: Subject to any disclaimer, the term of this patent is extended or adjusted under 35 U.S.C. 154(b) by 102 days.

(21) Appl. No.: 14/780,140

(22) PCT Filed: Jun. 18, 2014

(86) PCT No.: PCT/MY2014/000185
§ 371 (c)(1),
(2) Date: Sep. 25, 2015

(87) PCT Pub. No.: WO2015/194929
PCT Pub. Date: Dec. 23, 2015

(65) Prior Publication Data
US 2016/0150741 A1    Jun. 2, 2016

(51) Int. Cl.
*A01G 9/02*     (2006.01)
*A01G 9/10*     (2006.01)

(52) U.S. Cl.
CPC ............ *A01G 9/1073* (2013.01); *A01G 9/02* (2013.01); *A01G 9/10* (2013.01); *A01G 9/1066* (2013.01); *A01G 9/1086* (2013.01)

(58) Field of Classification Search
CPC ........ A01G 9/1073; A01G 9/108; A01G 9/02; A01G 9/10
USPC .................................. 220/600, 625, 62, 690
See application file for complete search history.

(56) References Cited

U.S. PATENT DOCUMENTS

| | | | |
|---|---|---|---|
| 1,792,356 A * | 2/1931 | Boiseau | A47G 25/12 211/126.14 |
| 3,313,333 A * | 4/1967 | Lordi | B65D 65/08 206/511 |
| 4,144,672 A | 3/1979 | Gradwell et al. | |
| 4,497,132 A | 2/1985 | Whitcomb | |
| 4,510,712 A | 4/1985 | Whitcomb | |

(Continued)

FOREIGN PATENT DOCUMENTS

| | | |
|---|---|---|
| FR | 2894770 | 12/2015 |
| JP | 0837827 | 2/1996 |
| JP | 09121687 | 5/1997 |

*Primary Examiner* — Kristen C Hayes
(74) *Attorney, Agent, or Firm* — Renner Kenner Grieve Bobak Taylor & Weber

(57) ABSTRACT

A plant cultivating container comprising a hollow cell (10) for holding a growing medium and a plant. The cell has side walls (11), a base (20) and an open top (12). Air vents (30) are disposed on the side walls of the container. The base is vertically-movable base with guide tabs (21) which are extendable though an air vent. When the vertically-movable base is pushed upwards to eject the cultivated plant, the vertical movement is guided by engagement of the tabs within the air vents resulting in uniform support at all sides of the base. This enables the removal of the growing medium and the plant cultivated within it, in a substantially compact unit resulting in minimized root damage and transplant shock to the cultivated plant. The air vents of the plant cultivating container further comprises retaining flaps (31) to aid in the pruning of the roots.

12 Claims, 8 Drawing Sheets

(56) References Cited

U.S. PATENT DOCUMENTS

| | | | | |
|---|---|---|---|---|
| 4,628,634 A | * | 12/1986 | Anderson | A01G 23/046 47/73 |
| 5,241,784 A | * | 9/1993 | Henry | A01G 23/04 47/66.1 |
| 5,372,269 A | * | 12/1994 | Sutton | B65D 3/04 220/4.09 |
| 6,862,844 B1 | | 3/2005 | Rubicz | |
| 8,261,488 B2 | * | 9/2012 | Kempf | A01G 9/10 47/78 |
| 8,973,302 B2 | * | 3/2015 | Jensen | A01G 9/108 47/66.6 |
| 9,572,309 B2 | * | 2/2017 | Russell | A01G 27/008 |

* cited by examiner

PLANT CULTIVATING CONTAINER

This invention relates to a plant cultivating container. More particularly, this invention relates to a plant cultivating container which facilitates easy removal of the cultivated plant.

DESCRIPTION OF THE PRIOR ART

Plant cultivating containers is a popular method of cultivating plants. This is because the environment contained within the container is more controlled and there is zero competition as there is only one plant per container. The growth conditions and requirements of each plant can be attended to separately. Once the plant has passed its early developmental stages, it will be ready for transplanting to an open area.

Previously, simple containers were used for cultivating plants. Such simple containers generally comprise side walls, a base and an open top. The base can be provided with drainage holes to allow excess water in the soil to drain freely.

The conventional method of cultivating plants in simple containers presents a problem when removing the plant for transplanting. Due to the resistance exerted by the plant roots, an upward pulling force is required to remove the plant from conventional containers. Upward pulling causes root damage and loosens the compactness of the growing medium that holds the root mass, which in turn results in transplanting shock that stunts the further growth of the plant.

There are simple devices comprising push rods such as those described in the abstract of Japanese publication no. 9-121687 which is adapted as a tool to push the bottom plate of the container upwards to eject the growing medium and plant out of the container. The containers used with such tools are not reusable as the bottom plate will be removed together with the growing medium and plant, and removal of the bottom plate causes the container to be destroyed. Using tools also inevitably causes the growing medium and plant to be pushed out unevenly. The push force is only mainly concentrated about the center of the bottom plate, and no support is provided at the corners and sides of the bottom plate once it is broken off from the sides of the container. This is undesirable as it oftentimes results in only a section of the growing medium and plant being pushed out. Such an event would cause the loosening of the growing medium as well as root damage to the plant.

U.S. Pat. No. 4,144,672 describes a plant container having a breakable base adapted for easy transplantation of the plant by pushing the base upwards with the cultivating medium and plant. The base has a weak periphery which is breakable when pressure is applied against the base from its bottom face. Such containers are not reusable and will have to be disposed after each use. The materials for making such containers must not be overly thick to allow for easy breaking of the base. Due to the relatively thinner materials used, the containers are not suitable for prolonged usage and are not be able to withstand long periods of exposure to heat and moisture.

In addition to easy transplantation, cultivating plants in containers allows for air-pruning of the roots. Such containers have air vents to promote air-pruning of the roots. Air vents are generally simple openings on the container sides which exposes roots to the ambient air. Humidity of the air outside the container is relatively lower than within the growing medium. The low humidity causes root tips to dehydrate and stop growing, thus, resulting in them becoming air-pruned. The pruned root will then produce many secondary roots, producing an ideal well-branched root system.

U.S. Pat. No. 4,497,132 describes an air-pruning container having air gaps consisting of vertical slits on the sidewall. It is described that air-pruning takes place along the vertical regions distributed around the container sidewalls so as to prevent spiral root growth and to promote root branching. Transplanting of a plant with a well-branched root system which strongly holds soil together within the container is not easy. Much effort is required to pull the plant out of the container. The delicate secondary roots will be damaged after transplanting of the plant has taken place. Hence, while air pruning is beneficial to the cultivated plant, using such containers causes transplanting shock which stunts the growth of the plant after it is transplanted.

This invention thus aims to alleviate some or all of the problems of the prior art.

SUMMARY OF THE INVENTION

In accordance with an aspect of the invention, there is provided a plant cultivating container comprising a hollow cell for holding a growing medium and a plant. The cell has side walls, a base and an open top. Air vents are disposed on the side walls of the cell. The base is vertically-movable and has guide tabs. The tabs are disposed such that each tab is extendable though an air vent. When the vertically-movable base is pushed upwards to eject the cultivated plant, the vertical movement of the base is guided by engagement of the tabs within the air vents resulting in uniform support at all sides of the base. This enables removal of the growing medium and the plant cultivated within it, in a substantially compact unit resulting in minimized root damage and transplant shock to the cultivated plant. The fully supported base prevents the growing medium and the plant cultivated within it from tumbling sideways as it is pushed upwards which causes the loosening of the growing medium and damage to the roots.

The plant cultivating container of the present invention provides reusability. There is no part or structure of the container that will be destroyed during transplantation of the plant cultivated within it.

In an embodiment, the hollow cell may further comprise at least one air vent on each side wall.

In a further embodiment, the air vent is of a vertical configuration and spans at least more than half of the height of the side walls of the hollow cell.

In another embodiment, the air vent may further comprise a pair of retaining flaps, each flap provided at opposing sides of the vent. The flaps are biased inwardly towards the interior of the container, to impede outward root growth. The retaining flaps of the air vents improve pruning of roots. The flaps exert pressure on the roots which have grown out of the air vents. In addition to the effect of being air-pruned, the growth of the roots are also impeded by the pressure exerted on it by the flaps as the roots expand in size and grows further outwards. The pruned root will be able to produce secondary roots and thus, an ideal root system with many young vigorous roots.

In a further embodiment, the hollow cell may further comprise an inner bottom flange upon which the base rests within the hollow cell.

In an embodiment, the base may further comprise side surfaces with each side surface corresponding to a side wall of the cell. There may be at least one guide tab on each side surface. Having guide tabs on each side surface enables uniform guidance of the base on all of its sides during its upward vertical movement. This enables the base to support all sides and corners of the growing medium and plant cultivated within the container.

In another embodiment, the base further comprises drainage holes.

In a further embodiment, the base of the plant cultivating container may be separately provided from the container and may be made of a material different from that of the container. This provides flexibility for the user to choose a suitable base according to the requirements of the plant and growing medium.

In an embodiment, the plant cultivating container may be made of polypropylene. The sufficiently strong but non-rigid material used for producing the plant cultivating containers of the present invention produces containers that are durable and are able to withstand long periods of exposure to heat and moisture, whilst still enabling parts of the container to be bendable. This is particularly advantageous for forming movable parts such as the retaining flaps, which are capable of being biased in a particular direction.

In a different embodiment, a plant cultivation tray may comprise a plurality of the plant cultivating containers of this invention.

Additional advantages of the plant cultivation container of this invention will be elaborated in the following pages.

BRIEF DESCRIPTION OF THE DRAWINGS

The invention is illustrated, although not limited, by the following description of embodiments made with reference to the accompanying drawings in which.

DETAILED DESCRIPTION OF THE EMBODIMENTS

The plant cultivating container of this invention mainly comprises a hollow cell 10 having a vertically-movable base 20.

Figure 1:
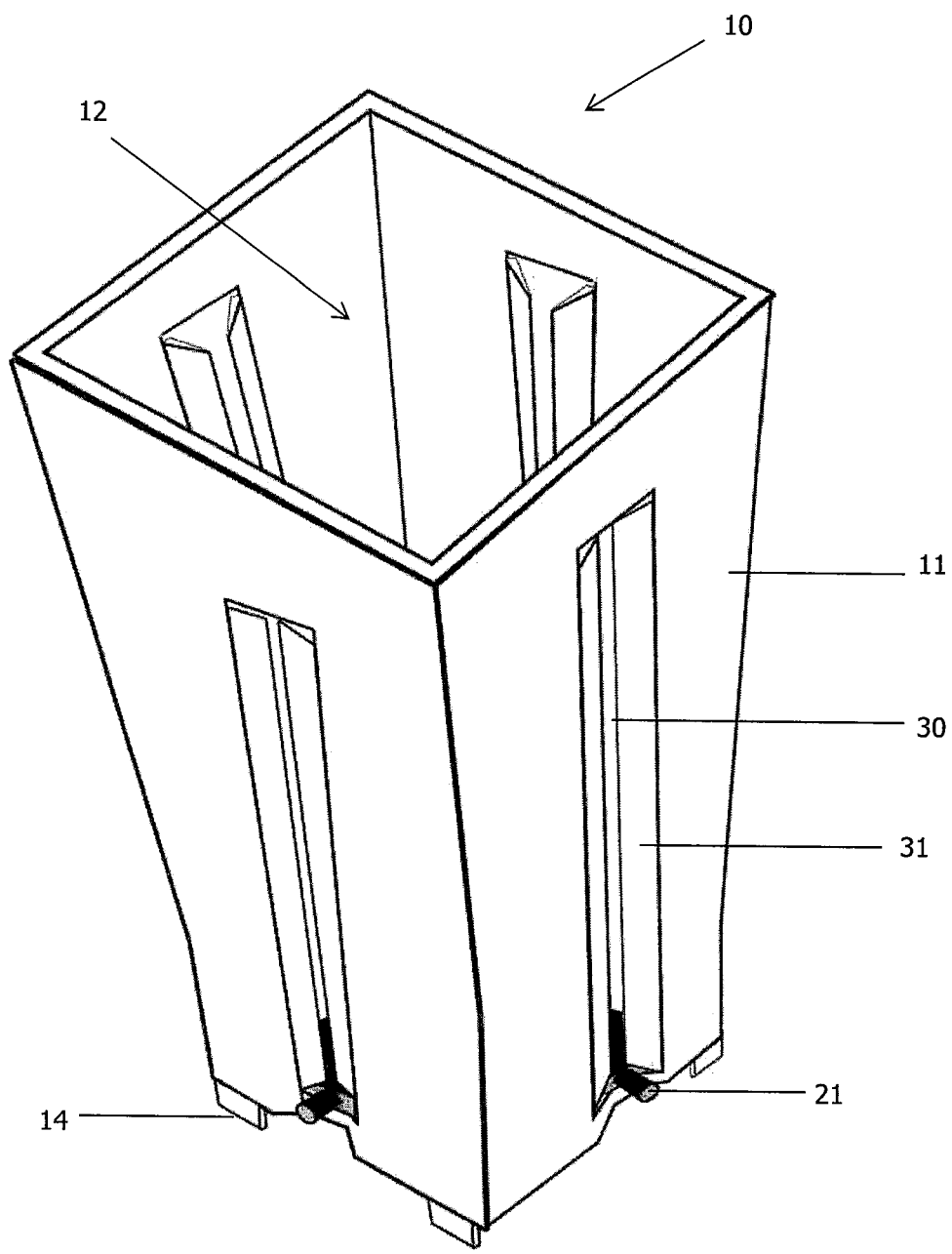
FIG. 1 shows a perspective view of the plant cultivating container according to the present invention.

As shown in FIG. 1, the plant cultivating container has a relatively vertical configuration and is a generally upright container comprising a hollow cell 10. The container may be of any suitable shape and generally comprises side walls 11, a base 20 and an open top 12. The hollow cell 10 may be uniformly shaped throughout its height, or it may have a tapered configuration. The tapered configuration of the hollow cell 10 may be tapered towards its base 20 or top 12, i.e. downwardly or upwardly tapered. As shown in FIG. 1, the plant cultivating container may be an inverted frustopyramidal shaped hollow container with four side walls 11, an open top 12 and a base 20 with the top 12 being wider than the base 20.

The plant cultivating container may be made of any suitable durable and non-rigid material such as any kind of suitable plastic, for example polypropylene, which is sufficiently strong but yet non-rigid. Once such a material is folded, it will be biased in the direction of the fold, although, still allowing for minor adjustments when force is applied. The base 20 may be made of the same type of material as the container or a different type of material of a different hardness. Having the base 20 made of a harder material enables a heavier mass of growing medium to be held in the container. The materials for making the base 20 may depend on the type of growing medium used with the container. The base 20 may be substituted with a base 20 made of a material more suited to the different types of growing medium.

Figure 5:
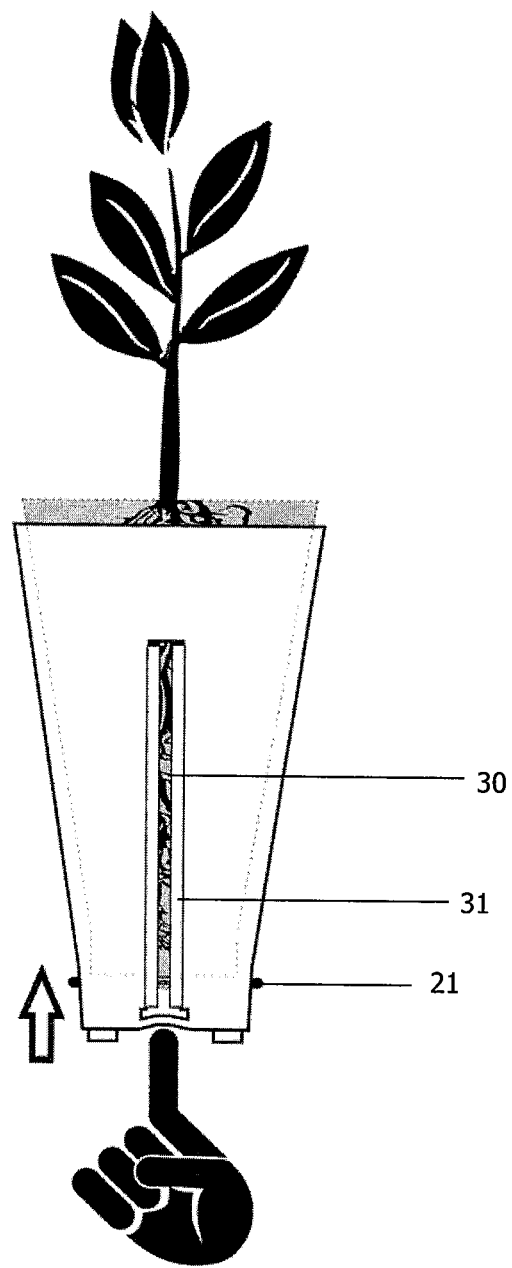
FIG. 5 shows the usage of the plant cultivating container according to the present invention.
Figure 6:
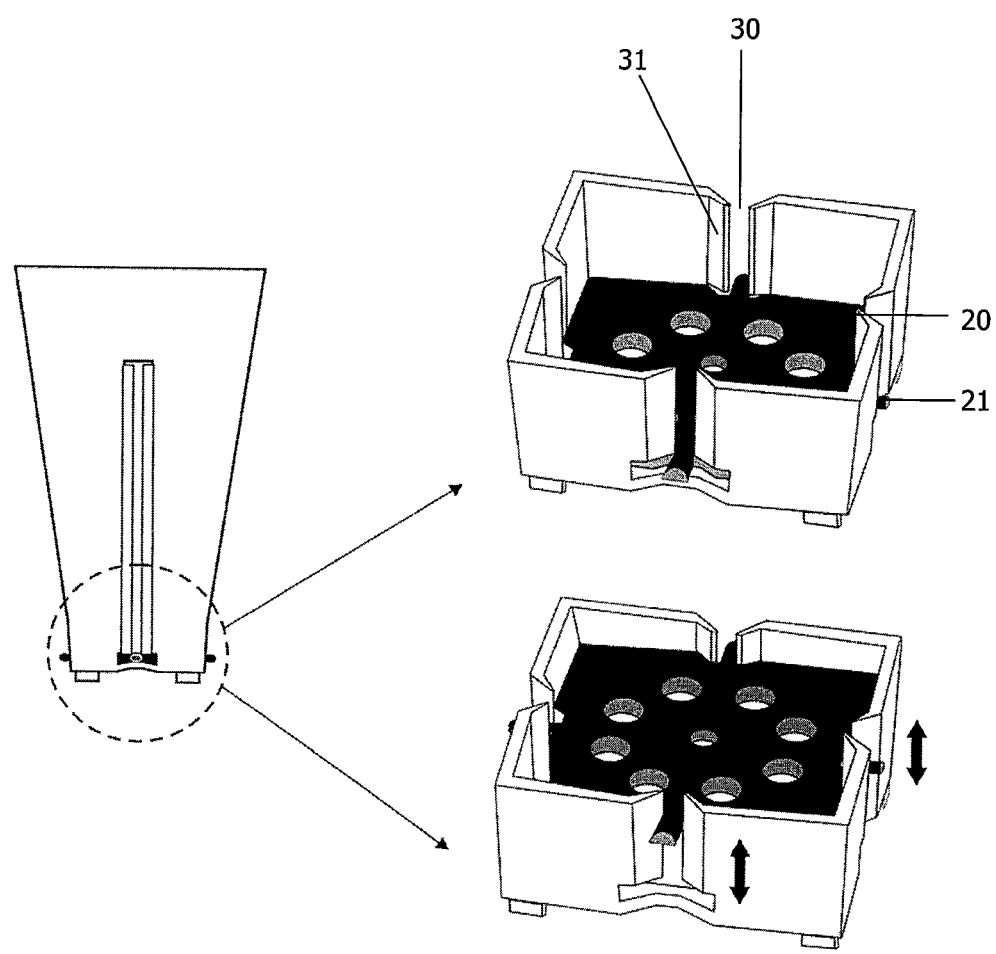
FIG. 6 shows the engagement of the guide tabs and retaining flaps according to an embodiment of the present invention.

Air vents 30 for air-pruning the roots are disposed on the side walls 11 of the container. The container may comprise at least one air vent 30 on each side wall 11. The air vents 30 may be provided as simple vertically disposed openings that span at least more than half of the height of the container or even along the entire height of the container. As shown in the example of FIGS. 1, 5 and 6, the air vent 30 may be centrally disposed on each side wall 11 of the container.

Figure 2:
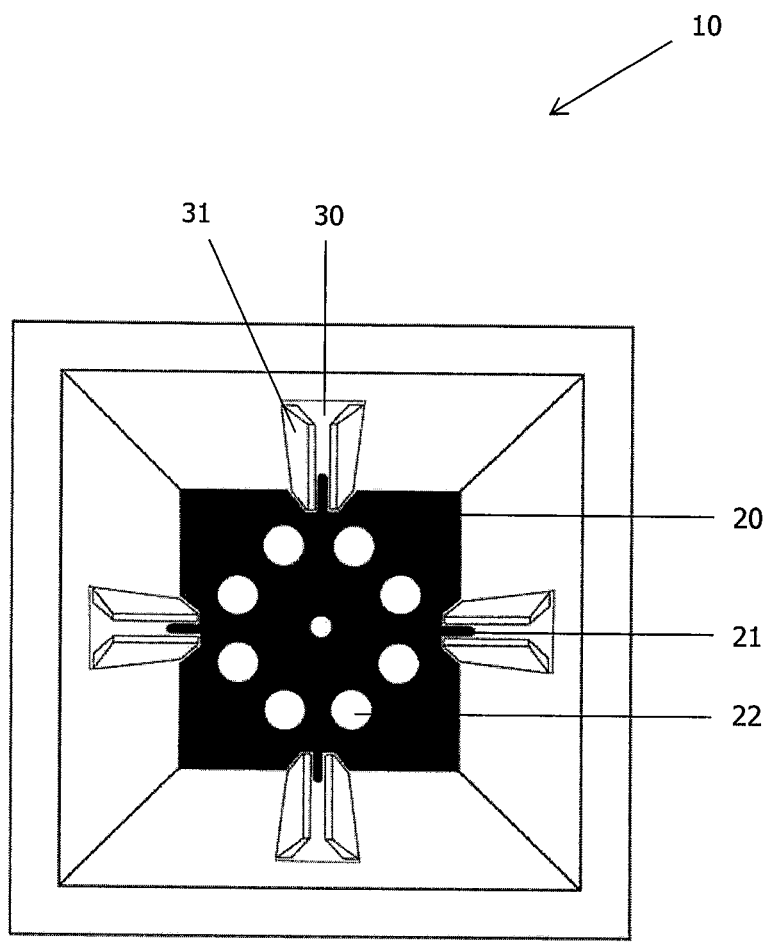
FIG. 2 shows a top view of the plant cultivating container according to the present invention.
Figure 3:
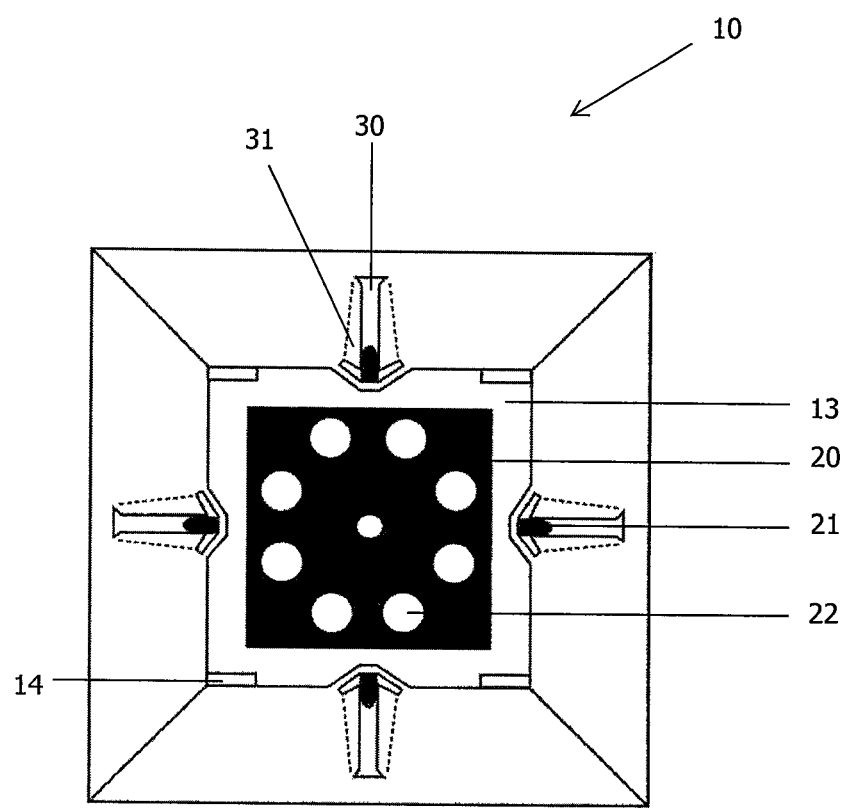
FIG. 3 shows a bottom view of the plant cultivating container according to the present invention.
Figure 4:
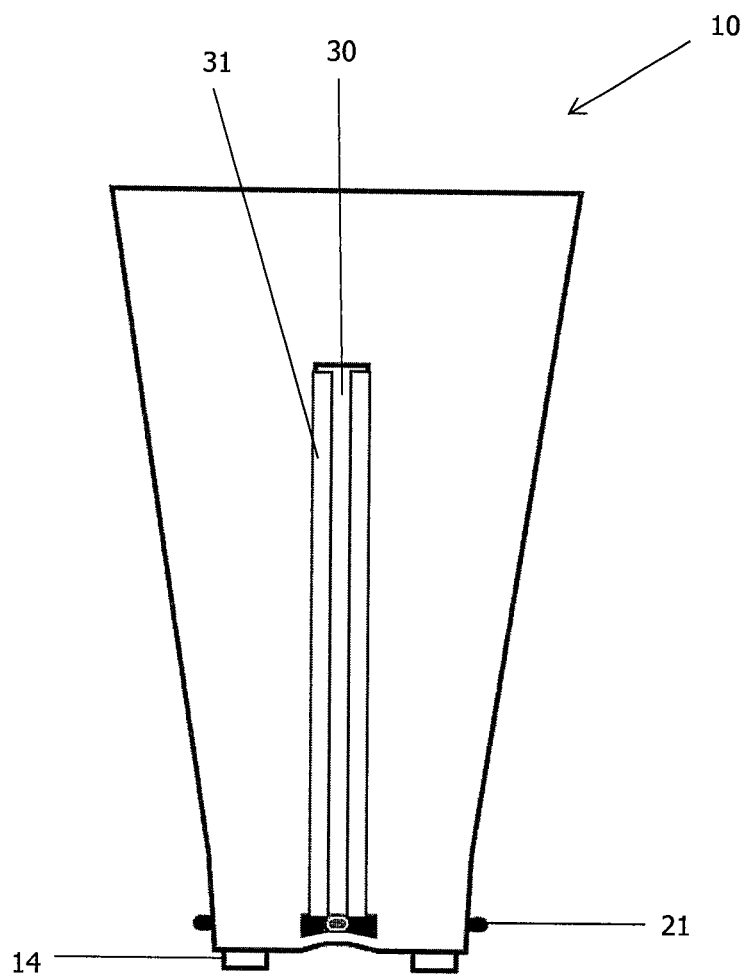
FIG. 4 shows a side view of the plant cultivating container according to the present invention.

Each air vent 30 may further comprise a pair of retaining flaps 31 at opposing sides. The flaps 31 may be attached to the air vents 30 or provided to be integral with the side walls 11 of the container. The flaps 31 are biased inwardly towards the interior of the container as shown in FIG. 2.

The flaps 31 may be formed by punching in a portion of the container side wall 11. Firstly, the position of the intended air vent 30 on the wall is identified. Subsequently, a pair of vertically spaced minor lateral cuts are made on the side wall 11. These lateral cuts define the top and bottom of the air vent 30. A vertical slit can then be made at the center of and between the top and bottom cuts. The portion of the side wall 11 at either side of the vertical slit can then be punched inwardly to form the flaps 31. When the air vent 30 is formed in this manner, there is no gap between the flaps 31 when they are not biased inwardly. Alternatively, the air vent 30 can be formed with the retaining flaps 31 spaced apart from one another thereby defining a gap therebetween.

Figure 7:
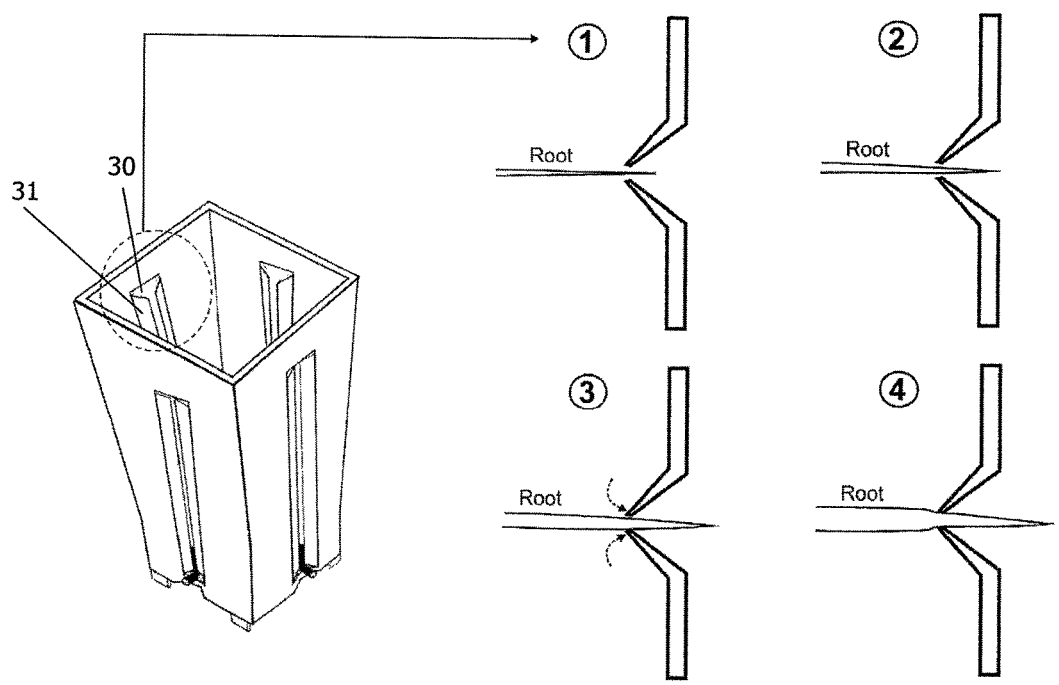
FIG. 7 shows a sequence of events of impeding the outward growth of the cultivated plant root by the retaining flaps according to an embodiment of the present invention.
Figure 8:
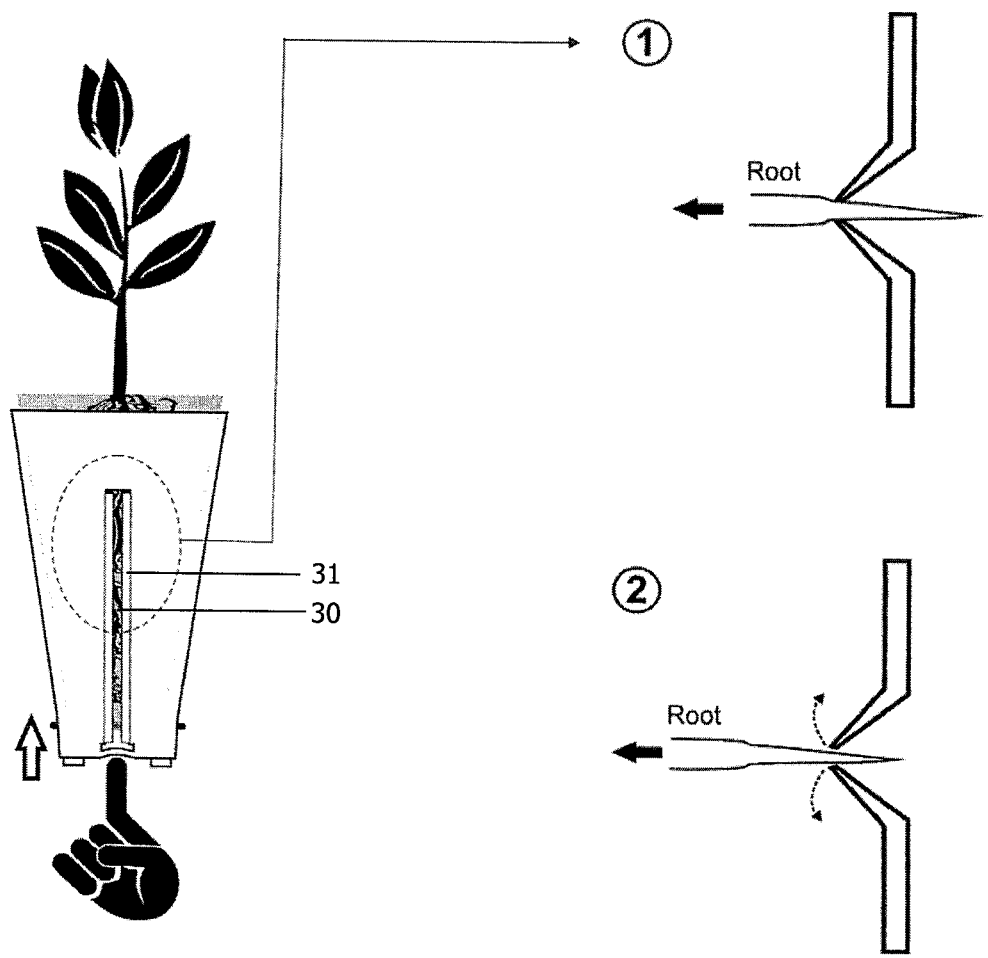
FIG. 8 shows a sequence of events of the inward pulling motion of the retaining flaps according to an embodiment of the present invention.

The air vents 30 of the present invention having retaining flaps 31 is an improvement to conventional air vents 30 of plant cultivating containers. The retaining flaps 31 provide a supplementary pruning of the roots in addition to air-pruning. When the plant roots grow out of the air vents 30, the plant roots are constantly expanding and increasing in diameter. Eventually, the roots will come into contact with the edges of the retaining flaps 31. Pressure exerted on the roots by the retaining flaps 31 will impede further expansion of the roots as shown in the sequential diagram in FIG. 7. Further outward growth of the roots will cause the attached retaining flaps 31 to move outwardly causing the interval between the opposing flaps 31 to reduce. As the interval between the opposing flaps 31 reduce, the flaps 31 exert pressure on the root which will impede the root's outward growth. Overall, the retaining flaps 31 exert pressure on the roots impeding further growth with regard to the expansion and the outward growth of the roots. When ejecting the growing medium and cultivated plant, the roots in between the flaps 31 faces an inward pulling motion and this inward pulling motion also correspondingly affects the flaps 31 causing the flaps 31 to move inwardly, thereby increasing the interval between opposing flaps 31 as shown in the sequential diagram in FIG. 8. Thus, the flaps 31 do not damage the roots when the plant is being ejected from the container.

The container may further comprise bottom support legs 14. The bottom support legs 14 may be provided on the outer bottom face of the container and positioned adjacent to the inner bottom flange 13, preferably at the corners of the plant cultivating container.

Although not shown in FIGS. 1 to 8, the hollow cell 10 may further comprise an outer lip portion. The outer lip portion may preferably be located at the top of the container on its outer surface such that it surrounds the container opening. This outer lip portion may be adapted as a handle for the user to hold onto when handling the plant cultivating container. Further when a stack of containers are nested together, this outer lip portion aids in easy removal of the containers from the stack.

The base 20 of the plant cultivating container is vertically-movable. It may be separately provided from the container. When in use, the vertically-movable base 20 is disposed inside the container.

The container may further comprise an inner bottom flange 13. The inner bottom flange 13 may preferably be located at the bottom of the hollow cell 10. The presence of an inner bottom flange 13 at the bottom of the hollow cell 10 enables the base 20 to rest inside the container as can be seen in FIGS. 1 to 4. The hollow cell 10 together with the vertically-movable base 20 forms a vessel for holding a growing medium and a plant.

The vertically-movable base 20 may comprise a flat plate preferably having a corresponding shape to the cross section of the hollow cell 10. The base 20 has side surfaces with each side surface corresponding to a side wall 11 of the cell. The base 20 may be disposed within the cell such that there is a perimeter gap defined between the base 20 and the side walls 11 of the container.

The base 20 of the plant cultivating container has guide tabs 21, located at positions on its side surface that corresponds to the air vents 30. Each tab 21 is extended through an air vent 30 when the vertically-movable base 20 is in use. At least one tab 21 is provided on each side of the base 20. When the vertically-movable base 20 is at rest inside the container, the guide tabs 21 are not engaged with the retaining flaps 31 of the air vents 30. Rather, the tabs 21 are directly below the air vents 30 protruding out of the base of the container.

In the embodiment of the plant cultivating container with air vents 30 comprising retaining flaps 31, cutout portions may be provided on the vertically-movable base 20 adjacent the tabs 21. The cutout portions adjacent the tabs 21 of the vertically-movable base 20 forms a catch for the retaining flaps 31 of the air vents 30. As the vertically-movable base 20 is pushed upwards, the flaps 31 will move into the cutout portions and will not obstruct the base 20 from moving upwards.

The vertically-movable base 20 may further comprise drainage holes 22, which enables draining of excess water within the growing medium. The number of drainage holes 22, as well as the size and shape of the drainage holes 22, of a vertically-movable base 20 depends on the water requirements of the plant and/or water retention or drainage characteristics of the growing medium.

Before using the plant cultivating container, the vertically-movable base 20 best paired with the requirements of the plant and conditions of the growing medium may be selected. A different vertically-movable base 20 may be paired with a different plant and growing medium for a later use. The user of the plant cultivating container has the flexibility of choosing the vertically-movable base 20 made of the most appropriate material (most suited to the requirements of the growing medium and plant) for each use. Thus, the vertically-movable base 20 can potentially be substituted with a different base before each use.

The plant cultivating container can be provided as a single container or as a plurality of containers arranged adjacent to one another to form a plant cultivation tray.

To use the exemplary embodiment of the present invention as seen in FIGS. 1 to 8, the user need only place growing medium and a seed into the plant cultivating container. After a period of time, when the seed has grown into a plant and is ready for transplanting, the user need only push the vertically-movable base 20 of the container upwards with fingers to eject the cultivated plant as shown in FIG. 5. Alternatively, the vertically-movable base 20 may be pushed with a tool or any other suitable means. As the vertically-movable base 20 of the present container is pushed upwards, the guide tabs 21 are engaged within the air vents 30, resulting in uniform support at all sides of the base 20 during upward movement. The cutout portions of the vertically-movable base 20 act as a catch for the retaining flaps 31 to reduce further inward movements of the retaining flaps 31 which will obstruct the base 20 from moving upwards as shown in FIG. 6. The base 20 being supported at all sides prohibits lateral movement (tipping, swaying, etc) and only allows for the guided upward movement of the base 20 carrying the growing medium and the cultivated plant, thus, preventing lateral movement of the growing medium and the cultivated plant as it is pushed upwards, which leads to loosening of the growing medium and damage to the roots.

All directional statements such as front/forward, back/rear, top, bottom, lateral, inward, outward, made herein are relative to the orientation of the plant cultivating container when in use.

As will be readily apparent to those skilled in the art, the present invention may easily be produced in other specific forms without departing from its scope or essential characteristics. The present embodiments are, therefore, to be considered as merely illustrative and not restrictive, the scope of the invention being indicated by the claims rather than the foregoing description, and all changes which come within therefore intended to be embraced therein.

The invention claimed is:

1. A plant cultivating container, said container comprising a hollow cell for holding a growing medium and a plant, said cell having side walls, a base and an open top;
   air vents disposed on the side walls of said cell, said vents including openings that allow air flow therethrough for air pruning of plant roots, and wherein said vents further include movable retaining flaps biased inwardly for supplementary pruning of plant roots;
   said base being vertically-movable and having guide tabs, said tabs are disposed such that each tab is extendable through an air vent;
   whereby, when said base is pushed upwards to eject the cultivated plant, the vertical movement of the base is guided by engagement of said tabs with said retaining flaps within said air vents resulting in uniform support at all sides of the base, thereby enabling removal of the growing medium and the plant cultivated within it, in a substantially compact unit resulting in minimized root damage and transplant shock to the cultivated plant.

2. The plant cultivating container according to claim 1, wherein said hollow cell further comprises at least one air vent on each side wall.

3. The plant cultivating container according to claim 1, wherein each said air vent is of a vertical configuration and spans at least more than half of the height of said cell.

4. The plant cultivating container according to claim 1, wherein each said air vent comprises a pair of retaining flaps provided at opposing sides of each said vent.

5. The plant cultivating container according to claim 1, wherein said hollow cell further comprises an inner bottom flange upon which said base rests within said hollow cell.

6. The plant cultivating container according to claim 1, wherein said base further comprises side surfaces, each side surface corresponding to a side wall of said cell.

7. The plant cultivating container according to claim 6, wherein said base further comprises at least one guide tab on each side surface.

8. The plant cultivating container according to claim 1, wherein said base further comprises drainage holes.

9. The plant cultivating container according to claim 1, wherein said base is separately provided from said container.

10. The plant cultivating container according to claim 9, wherein said base is made of a material different from that of the container.

11. The plant cultivating container according to claim 1, wherein said container is made of polypropylene.

12. A plant cultivation tray comprising a plurality of said plant cultivating containers according to claim 1.

\* \* \* \* \*